W. H. SCHWAB AND F. B. SYKES.
AUTOMOBILE BUMPER.
APPLICATION FILED FEB. 17, 1917.

1,315,529. Patented Sept. 9, 1919.

UNITED STATES PATENT OFFICE.

WALTER H. SCHWAB AND FRANK B. SYKES, OF MILWAUKEE, WISCONSIN, ASSIGNORS, BY MESNE ASSIGNMENTS, TO BADGER MANUFACTURING CORPORATION, OF MILWAUKEE, WISCONSIN, A CORPORATION OF DELAWARE.

AUTOMOBILE-BUMPER.

1,315,529.   Specification of Letters Patent.   Patented Sept. 9, 1919.

Application filed February 17, 1917. Serial No. 149,169.

*To all whom it may concern:*

Be it known that we, WALTER H. SCHWAB and FRANK B. SYKES, citizens of the United States, and residents of Milwaukee, in the county of Milwaukee and State of Wisconsin, have invented new and useful Improvements in Automobile-Bumpers, of which the following is a description, reference being had to the accompanying drawings, which are a part of this specification.

The invention relates to buffers or bumpers.

The invention is designed more particularly to provide a buffer which may be readily and quickly attached to the front ends of the frame members of an automobile without the alteration by the drilling of holes through the frame of the machine or removal of parts therefrom.

It is now quite customary to provide a mud apron at the front of the automobile between the side frame members consisting of a sheet metal plate connected to the inner sides of said members. With the usual construction of automobile bumpers, the means for attaching the bumper brackets to the frame consists of straps or plates passing around both sides and beneath the side frame members. With an attaching means of this kind it would be necessary to drill holes or cut portions of the front mud apron away to attach the buffer thereto and to obviate this difficulty the present form of buffer bracket has been devised by forming a bracket which does not interfere with the mud apron.

A further object of the invention is to provide a simple and efficient bumper bracket construction which may be readily clamped onto the front ends of the side frame members of various degrees of curvature and is thus well adapted for use on cars of different types and makes.

The invention is further designed to provide a simple and readily adjustable buffer for automobile or other vehicles.

The invention consists in the several features hereinafter set forth and more particularly defined by claims at the conclusion hereof.

Figure 1:
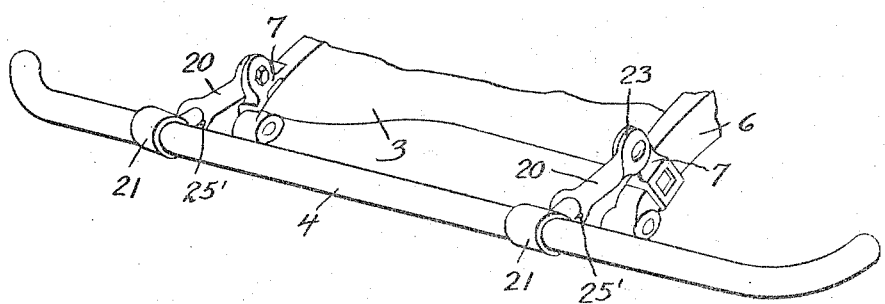
Figure 1 is a perspective view of the buffer showing it applied to the front end of an automobile.
Figure 2:
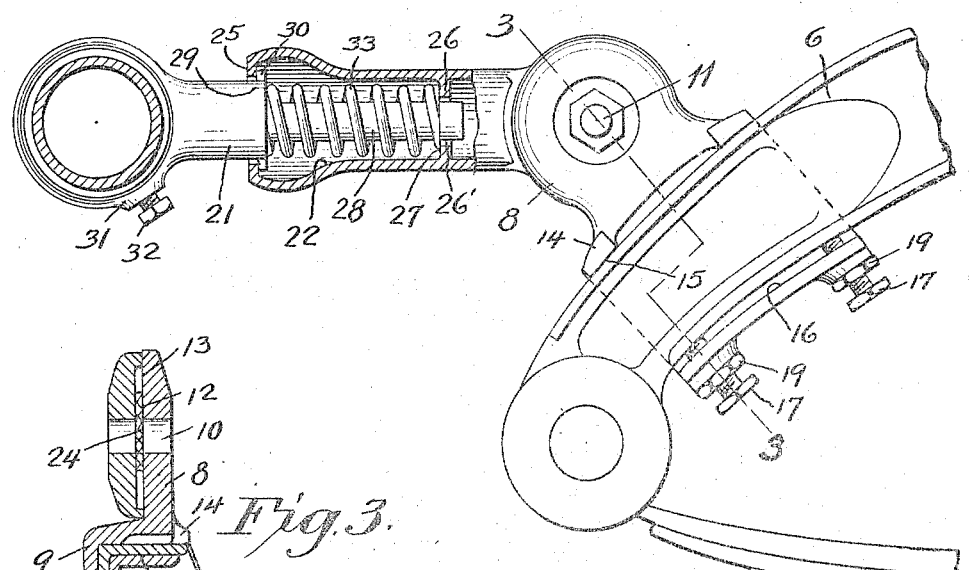
Fig. 2 is a side view of the device applied to the frame member of a vehicle, parts being broken away and parts being shown in section.
Figure 3:
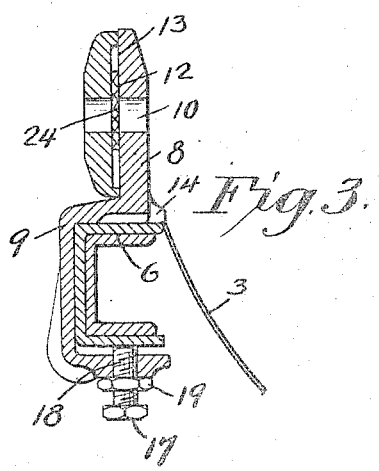
Fig. 3 is a section taken on the line 3—3 of Fig. 2.

In general, the device comprises a buffer bar 4 and means for adjustably connecting said bar to the front portion of the side members 6 of an automobile.

The means for adjustably connecting the bar 4 to the side members comprises brackets 7, a vertically adjustable yielding connection between the brackets and the bar, and means for adjustably connecting said brackets to the frame members.

In the present instance we have shown a round bar but it is to be understood that square, channel or diamond shaped bars may be used.

Each bracket 7 consists of a vertically extending upper portion 8 and a channel portion 9. The upper portion 8 has a horizontally extending hole 10 therein for receiving a pivot bolt 11 and an annular toothed portion 12 on its inner side 13, and outwardly extending lugs 14 on its outer side.

The upper and lower inner sides of the channel portion have arcuate inclined surfaces 15 and 16 so that the bracket may be slipped over the outer side, top and bottom of frame members of various curvatures and be secured thereto by set screws 17 engaging the under side of the lower flange of the channel frame member and have a wedging engagement between the bracket and the frame members, said screws passing through threaded apertures 18 in the lower flange of the channel portion of the bracket and being provided with lock nuts 19. A portion of the surface 15 is recessed between the lugs 14 so as to provide for ease of adjustment of the brackets in position on the frame member.

Thus the bracket may be tightly clamped to the frame member by the clamping and wedging engagement between the upper flange of the channel portion of the bracket with the upper flange of the frame member and the lower flange of the frame member with the screws 17, and the surfaces 15 and 16 are so curved as to permit the use of the bracket on frame members having front ends of various curvatures, the screws 17 accommodating for the changes. It will be noted that the channel portion 9 in combination with the screws 17 forms the means for detachably securing the bracket to its frame member. Thus the construction of the bracket above described permits of the ready attachment of the buffer to the side members 6 without interference with the mud apron 3 between said members.

The means for adjustably connecting the bar 4 to the brackets 7 comprises in each instance, a buffer arm 20 adjustably connected to the bracket for vertical movement with respect thereto, a rod 21 adjustably connected to the bar 4 and a yielding connection between said buffer arm 20 and rod 21. The buffer arm 20 consists of a tubular portion 22 and eyed end 23, said eyed end having an annular toothed portion 24 on one side thereof adapted to register with the toothed portion 12 on the bracket so that said arm may be secured in various positions of vertical adjustment with respect to the bracket and frame members by said toothed surface and the clamping and pivotal bolt 11 which locks said arm and bracket together. The tubular portion of the bracket has an annular flange 25 at its front end provided with notches 25' for a purpose hereinafter described and an annular web 26 forming an opening 26' therein and a shouldered portion 27. The rod 21 comprises a cylindrical portion 28, a shouldered portion 29 provided with lugs 30 and an eyed head 31 for adjustably receiving the bar 4 to which it is secured by a set screw 32. The yielding connection between the arm 20 and rod 21 is a spring 33 which surrounds the cylindrical portion of the rod 21 and is interposed between the web 26 and the shoulder 29, the rod being held within the tubular portion of the arm by the lugs 30 contacting with the flange 25, the rod being thus secured by bringing the lugs 30 into register with the notches 25' and moving the rod into the arm and thereafter turning the rod or arm to move said lugs or notches out of register.

In operation, any shock occasioned by the bar 4 striking or being struck by another object, will be transmitted to the frame members of the vehicle through the connecting means and the brackets and the springs forming part of the connection between the bar and the brackets will serve to partially absorb the shock delivered to the buffer bar.

Due to the tapering fit between the top and bottom flanges of the brackets and the tapered forward portion of the side bars any shock on the bar transmitted to the brackets will wedge the bracket and its fastening against the side bar to which it is attached and thus transmit the shock of impact to the side bars.

The invention thus exemplifies a buffer for automobiles of simple, efficient construction and adapted to be readily connected to those types of automobiles having front mud aprons without in any way interfering therewith.

What we claim as our invention is:

1. In an automobile bumper, the combination with a buffer bar, of a pair of one piece brackets for attachment to the curved front portions of the side frame members of an automobile, each of said brackets provided with a lower channel portion for embracing the top, bottom and one side of said members, set screws passing through the lower flange of said channel portion and engaging the under side of the lower flange of the channel frame member, and means for adjustably and yieldingly connecting said bar to said brackets, said brackets adapted to be secured either to abut against the outer side of the side bars or to abut against the inner side of the side bars.

2. In an automobile bumper, a one piece bumper bracket having a channeled portion adapted to embrace the top, bottom and one side of the tapered portion of the side bar of an automobile, said channeled portion being shaped to conform to the curvature of said bar to form a wedging engagement therewith when said bracket is subjected to impact, and a set screw for removably clamping the bracket to the side bar.

3. A bumper for attachment to the tapered portion of the side bar of an automobile, comprising a one piece bracket for embracing the top, bottom and one side of the tapered portion of the side bar and coöperating therewith by a wedging action when the bumper is subjected to impact, a set screw for removably clamping said bracket to the side bar, and means for attaching a bumper bar to said bracket.

In testimony whereof we affix our signatures.

WALTER H. SCHWAB.
FRANK B. SYKES.